United States Patent

Subramanian et al.

[11] Patent Number: 5,907,810
[45] Date of Patent: May 25, 1999

[54] METHOD FOR REDUCING PAGING LOAD IN A CELLULAR COMMUNICATION SYSTEM

[75] Inventors: Sairam Subramanian, Garland; Seshu R. Madhavapeddy; Alexander J. Montoya, both of Richardson; Hee C. Lee, Plano; Steven J. Currin, Allen; Falguni Sarkar, Dallas, all of Tex.

[73] Assignee: Northern Telecom Limited, Montreal, Canada

[21] Appl. No.: 08/743,689

[22] Filed: Nov. 6, 1996

[51] Int. Cl.[6] ..................................... H04Q 7/06
[52] U.S. Cl. .................. 455/458; 455/432; 455/434; 455/446; 455/453
[58] Field of Search ................... 455/422, 426, 455/432, 433, 434, 436, 446, 453, 456, 458, 466

[56] References Cited

U.S. PATENT DOCUMENTS

| | | | |
|---|---|---|---|
| 5,153,902 | 10/1992 | Buhl et al. | 455/458 |
| 5,369,681 | 11/1994 | Boudreau et al. | 455/458 |
| 5,533,094 | 7/1996 | Sanmugam | 455/426 |
| 5,633,915 | 5/1997 | Yang et al. | 455/453 |
| 5,805,993 | 9/1998 | Cherpantier et al. | 455/422 |
| 5,822,700 | 10/1998 | Hult et al. | 455/466 |

*Primary Examiner*—Willis R. Wolfe
*Attorney, Agent, or Firm*—John D. Crane

[57] ABSTRACT

A method for reducing the paging load in a cellular communication system is described. The cell C with the largest paging load L is first identified. Since this cell is usually included in more than one paging zone, the paging zones including cell C are identified. Thereafter, cell C is removed tentatively from each identified zone and a ratio R calculated which represents the decrease in loading on cell C due to being removed from zone z divided by the maximum increase in loading on any other cell in the network. The zone for which the ratio R is the largest is the best candidate for removing cell C therefrom. After doing so tentatively, the cell C' with the largest paging load L' thereon is identified. If the loading L is greater than L', cell C is removed permanently from the zone having the highest ratio R therefor and the process is repeated until L' is greater than L at which point the process is stopped without removing cell C from the zone with the highest ratio R.

18 Claims, 1 Drawing Sheet

METHOD FOR REDUCING PAGING LOAD IN A CELLULAR COMMUNICATION SYSTEM

RELATED PATENT APPLICATION

This invention is related to and expands on the technology described in pending patent application Ser. No. 08/423,739 filed on Apr. 18, 1995 and entitled "Cellular Mobile Communications System", still pending, the entire contents of which are herein incorporated by reference.

FIELD OF THE INVENTION

This invention relates broadly to mobile cellular communication systems, and in particular, to advanced paging methods for paging subscribers in such a cellular communication system while minimizing the paging load on the system.

BACKGROUND OF THE INVENTION

The cellular communications industry has experienced very rapid growth in both the areas serviced and the number of subscribers. It is not uncommon in many metropolitan areas in North America for mobile switching centers (MSC) to have service requests numbering in excess of 100,000 call attempts per hour. Each such switching center typically services a network of 100 or more cells and keeps track of all mobile telephones currently operating in its service area (SA) via a database commonly referred to as a visitor location register (VLR). This register stores information regarding the services available to each subscriber, his home mobile switching center and the current status (e.g., active or inactive) of the mobile telephone. The mobile switching center, however, does not usually have accurate information regarding the precise geographical location of each of the mobile telephones within the service area. Consequently, when a call is initiated to a mobile telephone believed to be within the service area, a page must be broadcast over the forward control channels (FOCCs), which are also known as the paging and access channels (PACH) to all cells in the service area. When the mobile telephone responds to the page message, the particular cell containing the mobile telephone is then identified from the reverse control channel used for the mobile response and the call is then set up. In the event there is no response to the page, the system assumes that the mobile telephone is currently inactive and the call is treated accordingly.

In view of the fact that each typical mobile switching center in an urban area serves a system with over 100 cells, in order to broadcast a page message over the forward control channels of all the cells in such a typical system, the paging message must be replicated a corresponding number of times and sent to each cell. As only one cell in the system can respond, this means that a large number of these paging messages are not required as they will result in no reply whatsoever. These unneeded paging messages are produced at the expense of the mobile switching center being available for performing another task. Hence, the overall system performance is degraded by the overhead caused by the generation of unneeded paging messages.

Various approaches have been suggested for overcoming this problem. In one such approach, the cellular system is partitioned into location areas which are smaller than the service area covered by the mobile switching center. Every time a mobile telephone leaves a location area and enters another location area, it registers a location update that indicates the mobile telephone is a visitor in the area from which the mobile telephone is registered. As a result, should a call be initiated to that mobile telephone, the paging message needs to be sent only to the cells in the location area where the mobile telephone is "visiting" thereby dramatically reducing system loading associated with paging that particular mobile telephone. However, this approach does increase the number of registration activities as registration occurs each time an active mobile telephone moves from one location area to another which will occur more frequently than would be required in systems where registration occurs only when a mobile telephone is moved from one service area to another.

A variant of the above described paging approach is known as zone paging. In this approach, a two dimensional array is developed known as a Location Accuracy Matrix (LAM). Each entry (i,j) contains the number of page responses received from subscribers in cell j when the last known location of the subscriber was in cell i. The LAM data is then used to develop a probability matrix (p(i,j)) which is the probability that a subscriber is in cell j given the fact that its last known location was in cell i. The zone used for paging a subscriber whose last known location was in cell i is all the cells j for which the probability p(i,j)>0.001. In the event that this selective zone page is unsuccessful, then all cells in the service area are paged in an attempt to locate the subscriber. If the all zone page is unsuccessful, the subscriber is assumed to have his/her mobile phone turned off.

Further attempts to reduce overall paging have proved somewhat successful. A more optimal approach has been developed where the inclusion of a cell j into a given zone Z(i) is based on whether inclusion of cell j increases or decreases the overall paging rather than on a single cut-off point of 0.001. This more optimal approach is accomplished by first determining the probability p(i,j) that a subscriber is in cell j given that its last known location was cell i and arrange these probabilities p(i,j) for all j in decreasing order and let the cells with decreasing probabilities be cells $j_1, j_2, \ldots j_n$. Next the zone Z(i) is initialized to contain no cells. For each k from 1 to n, include the cell $j_k$ in the zone if zone $j_{k-1}$ is in the zone and the following inequality is true:

$$k+(1-(P(i,j_1)+p(i,j_2)+ \ldots +p(i,j_k)))*n <= k-1+(1-(p(i,j_1)+p(i,j_2)+ \ldots +p(i,j_{k-1})))*n$$

The process is stopped when a value of k is reached where the inequality fails. The more optimal zone Z(i) then consists of the cells $j_1, j_2, j_3, j_{k-1}$. This more optimal approach does reduce paging compared to the earlier described zone paging approach, however, it does still leave considerable paging in the worst-case cell. The higher paging in the worst-case cell is due to the previously unrecognized consequence of having such worst-case cell in more than one zone.

OBJECT OF THE INVENTION

In view of the above outlined difficulties with known paging approaches for cellular phone systems, it is a primary objective of the present invention to provide a cellular telephone system which has reduced worst-case cell paging compared to earlier designs.

BRIEF DESCRIPTION OF THE INVENTION

This invention relates to a cellular phone system in which worst case paging is minimized. The system records the location of all the mobile phones served by the system each time the phone is paged by the system. This data, in combination with the data indicating the previously last known servicing cell for each mobile station served by the system, is utilized to develop probabilities P(i,j) which comprises the probability that any mobile is in cell j when it was last known to be in cell i. The probabilities P(i,j) are then ordered from largest to smallest. Then, zones Z(i) are developed which define the cells that will be paged first based on the last known cell i where a given mobile was located. A particular cell k is included in the zone Z(i) if the following inequality is true or each value of k from 1 to n:

$$k+(1-(P(i,j_1)+P(i,j_2)+\ldots +P(i,j_k)))*n$$
$$<=k-1+(1-(P(i,j_1)+P(i,j_2)+\ldots +P(i,j_{k-1})))*n.$$

Once the zones have been established by this process, then the overall paging load is determined due to the inclusion of each cell in more than one zone. In this iterative process, high traffic cells are removed form zones where the benefit of having them is minimal. This process will result in a somewhat increased overall paging load on the system but reduces the worst-case cell paging dramatically.

BRIEF DESCRIPTION OF THE DRAWINGS

The above mentioned objects, advantages and features of the present invention are described below in connection with the drawings which form a part of the disclosure wherein.

DETAILED DESCRIPTION

This invention provides a mechanism, within a cellular telephone network, to reduce the worst-case cell paging within the system. Paging is a process for locating a mobile station within a mobile network. In the normal operation of a mobile system, each time a mobile station is turned on, it registers with the mobile system. Registration serves to locate the mobile station as being within the service area of a given cell of the system. Since mobile stations are most frequently carried by subscribers who are traveling from one location to another, the mobile station may not remain within the cell in which it most recently registered. This means that if a call for the mobile station were directed solely to the cell where the mobile last registered, the call may not be completed in a very large number of cases.

One approach to overcoming this problem is to have mobiles re-register periodically. This approach, however, increases the system overhead and decreases the utilization of the cellular system. Hence, re-registration is not done frequently and typically occurs at a rate of once every 15 or 20 minutes. This means that there is ample time for a mobile station to be moved from the cell where registration last occurred to another cell.

When a call is to be directed to a given mobile station, a paging signal is sent out requesting that the mobile station respond. This is required because there is no feasible way to know exactly what cell service area the mobile is located in. Paging all cells in the network, however, is undesirable because the mobile can be serviced by only one cell and paging at all cells increases the paging level on the system and reduces its overall efficiency. Therefore, zone paging has become the preferred approach to reducing the overall paging load. The concept here is to define zones of cells which are paged first when looking for a particular mobile before paging the whole system. The zones are selected to be the cells in which the mobile is most likely to be in given the fact that the last known location of the mobile was in the service area served by a given cell.

Figure 1:
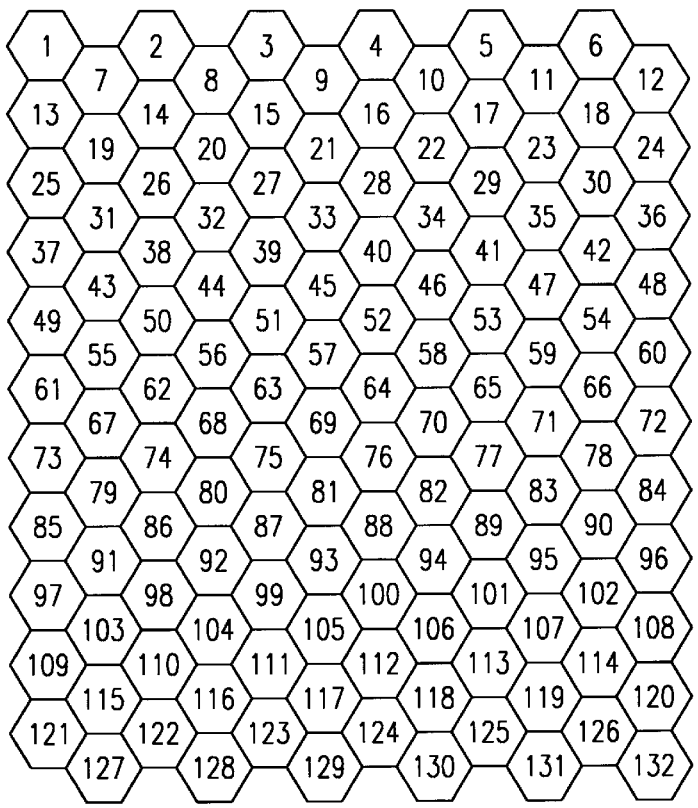
FIG. 1 schematically illustrates a cellular network with a plurality of cells therein.

This is illustrated by FIG. 1 which includes a plurality of adjacent hexagons with a number therein. Each hexagon is representative of the geographic area served by a given cell identified by the number included therein. Let us assume that a given mobile station was turned on while physically located in the geographic area served by cell 45. One can readily imagine that the mobile may have moved to any of the cells immediately adjacent thereto before the mobile will be asked by the system to register again. Therefore, one could easily understand that if a zone were established containing cells 45, 33, 39, 40, 51, 52 and 57, there would be a higher probability that a paging signal for that mobile station will be responded to if all the cells in this zone issued the paging signal. In actual practice today, however, zones are established in a much more scientific manner than simply including the cells adjacent the cell in which the mobile was last known to be located. One such approach is described below although other approaches may be employed.

As mentioned above, this invention relates to reducing the worst case paging. This relates to the fact that when a network operator defines zones for paging irrespective of the specific approach, selected cells will appear in more than one zone. This means that any paging in any zone containing that cell will occur within that cell. Thus some cells are likely to experience a great deal of paging activity due to the fact that they are included in many zones. This can be visualized in FIG. 1 by considering the zone defined above and a second zone including cells 52, 40, 45, 46, 57, 58, and 64. Cells 52, 40, 52 and 57 appear in each of these zones and that a page in either zone will affect these cells. In a more complex zone configuration, some cells may have dramatically increased paging load giving rise to some cells in which the paging load is very high indeed.

One approach for defining the zones for a zone paging scheme is described below. First, statistics are kept over an extended period of time such as a week or longer period of time. During that time, records are kept as to the last known cell for each mobile unit as well as the next identified cell in which the location of the same mobile unit is subsequently identified. Once this data is collected, then (1) the probability P(i,j) is calculated for every cell in the network. P(i,j) is the probability that a mobile unit, previously located in cell i, will next be located in cell j. Thereafter, all the probabilities P(i,j) are ordered from largest to smallest for each cell i and let the list of cells of decreasing probabilities be $\{j_1, j_2, \ldots, j_n\}$ where n is the number of cells in the system. (2) The zone Z(i) is then initialized to contain a null set. (3) For each k from 1 through n, include the cell $j_k$ in the zone if $j_{k-1}$ is in the zone and the following inequality is true:

$$k+(1-(p(i,j_1)+p(i,j_2)+\ldots +p(i,j_k)))*n<=k-1+(1-(p(i,j_1)+p(i,j_2)+\ldots +p(i,j_{k-1})))*n$$

(4) This process is repeated until a value for k is determined where the above equation is not true. Then the zone Z(i) consists of the cells $\{j_1, j_2, \ldots, j_{k-1}\}$.

The optimized zone definition produced by using steps (1)–(4) above is but one approach for defining zones in a zone paging system. Other known or new methods of defining the zones may also be utilized in connection with this invention. Regardless of the approach utilized to define the cells in each zone, many cells will be included in multiple zones. When this occurs, the loading on those cells due to paging may become quite considerable. Therefore, the present invention is directed to reducing this paging load on the cells with the worst paging load.

Figure 2:
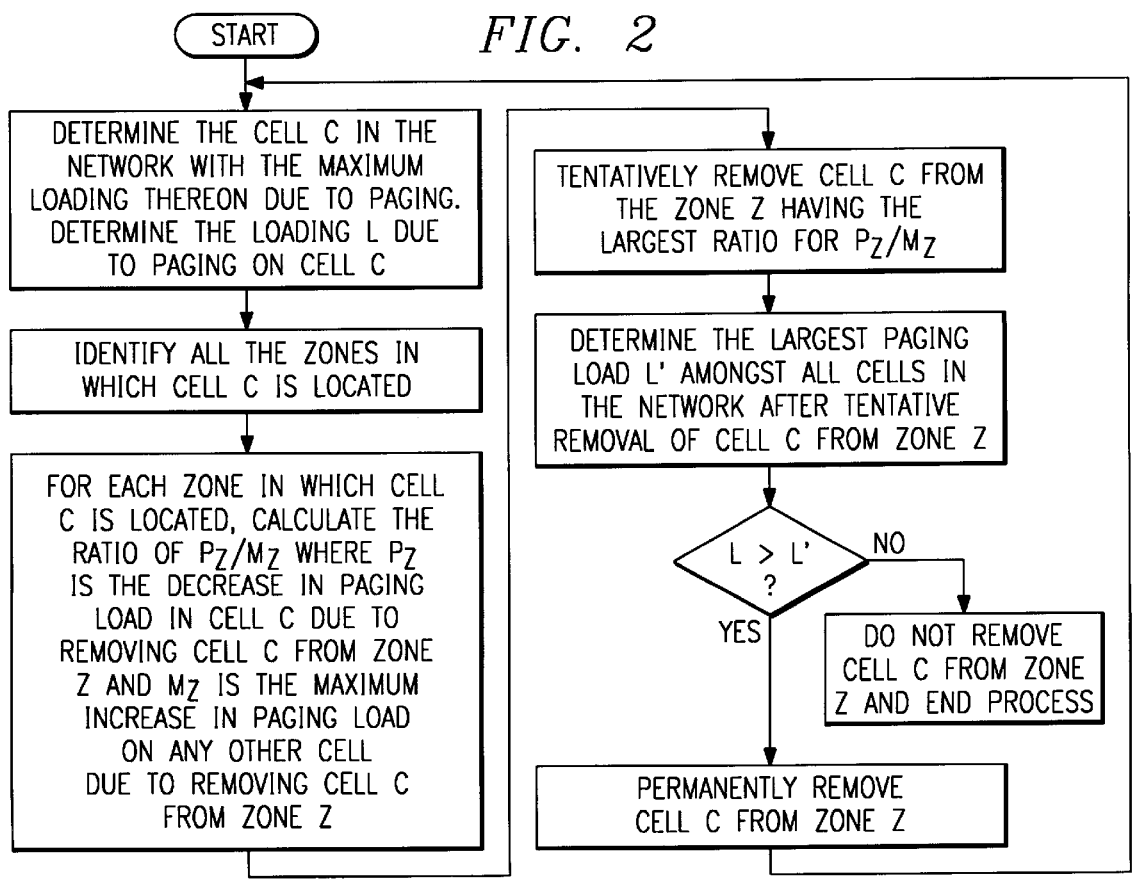
FIG. 2 is a flow chart which illustrates the method of the present invention.

The approach of this invention is to identify a bottleneck cell C, the cell which receives the highest paging traffic in the network. Then the zones which include cell C are identified. For each of the zones, the paging traffic is recalculated assuming the cell C has been removed one zone at a time. Then $p_z$ is calculated which is the percentage reduction in the paging traffic in cell C if cell C is removed from paging zone Z. Next, $m_z$ is calculated which is the maximum increase in paging load on any other cell in the entire network as a result of C being removed from zone Z. Thereafter, the ratio of $p_z/m_z$, is calculated. Once all of these ratios have been calculated, the zone for which the ratio is the largest is the candidate for having cell C removed therefrom. The decision to actually remove cell C from the zone Z for which the ratio $p_z/m_z$ is a maximum is made as follows. The paging load L on the cell C is calculated prior to its removal from zone Z. Then, the largest paging load L' is identified amongst all the cells in the network after the proposed removal of cell C from zone Z. If load L is greater than load L', then cell C should be removed from zone Z as the remaining worst case loading L' caused by paging after removal of cell C is smaller than the worst case loading L was prior to removal of cell C. This approach is illustrated in FIG. 2.

As noted above, the first objective is to identify the bottleneck cell C. This is done by identifying the specific cell C which has the maximum paging load defined herein as the largest paging load pg(x) over all cells x in the network. One method for determining the cell C with the maximum paging load is to determine which cell C has the highest probability of all cells in the network of being paged. For each cell x in the network, the probability pg(x) that cell x will be paged is calculated using the following equation:

$$pg(x) = \sum_{Z(i) \in CZ(x)} l_i + \sum_{Z(i) \in NCZ(x)} l_i(1 - P(Z(i))r) \qquad (eq. 1)$$

where:
  $l_i$ is the probability that the last known cell of mobile m is i;
  CZ(x) is the set of zones containing the cell x;
  NCZ(x) is all other zones;
  r is the probability that the mobile will respond given it is in zone Z(i); and
  P(Z(i)) is the probability that the mobile m is in zone Z(i) given the last known location of mobile m is cell i. This is calculated as shown in eq. 2.

$$P(Z(i)) = \sum_{j \in Z(i)} P(i, j) \qquad (eq. 2)$$

Alternative methods are available for determining the bottleneck cell C. They include other statistically determined approaches as well as actual measurement of which cell receives the largest paging load in the network. Any such approach may be utilized in the present invention to identify the bottleneck cell.

Once the bottleneck cell x has been identified, then the specific zone containing cell x from which cell x is to be removed must be determined. This is done conceptually by determining the reduction in the paging load on cell x due to its removal from each of the zones Z containing cell x (quantity $p_z$) divided by the maximum increase of paging load on any other cell in the network due to removal of cell x from that zone Z(quantity $m_z$). The zone Z for which this ratio ($p_z/m_z$) is the largest is the zone from which cell x should be conditionally removed. The quantities $p_z$ and $m_z$ are calculated using equations 3 and 4.

$$p_z = l_i - l_i(1 - [P(Z(i)) - P(i,x)]r) \qquad (eq.3)$$

$$m_z = l_i(P(i,x)r) \qquad (eq.4)$$

where P(i,x) is the probability that the mobile m is located in cell x given that it was last known to be in cell i.

The actual form of the equations used will depend on the type of paging involved. For the example illustrated here, the paging mechanism involves selecting a zone containing a plurality of cells which are first paged when a call is placed for a given mobile unit. The zone is determined based on the last known cell for the mobile being paged. In the event that the mobile unit being sought is not located within the zone paged as evidenced by the fact that it did not respond to the page in the zone, all remaining cells are paged to determine if the mobile unit being sought is within the area served by the remaining cells in the network.

Once the zone is defined with the maximum ratio of $p_z/m_z$, the bottleneck cell is tentatively removed from that zone. Next, the largest paging load pg(y) for all cells is then calculated again for the newly defined zones. If the largest newly calculated paging load pg(y) is smaller than the largest paging load pg(x) calculated before tentatively removing the bottleneck cell from the zone with the maximum ratio $p_z/m_z$, the bottleneck cell is permanently removed from the zone and the process is repeated until removing a bottleneck cell causes an increase in the paging load on the remaining worst case cell.

All of the above equations are useful in a paging scheme where a given mobile m is first paged in the zone Z(i) where i is the last known cell location of the mobile m. Then, assuming the mobile m does not respond to the first paging request, all other cells not contained in zone Z(i) are paged to attempt to contact mobile m. In the event other paging approaches are utilized, the specific approach to measuring paging load, the decrease in paging load due to removing a cell from a zone and the maximum increase in paging load on all other cells may be calculated in a different manner than that described above. However, these approaches will work in accordance with the present invention to reduce the overall network load due to paging.

While the above mentioned objects, advantages and features of the present invention have been described in connection with the preferred approach, those of skill in the art will readily recognize that the alternative approaches mentioned above and other similar approaches may be utilized without departing from the spirit and scope of the present invention as defined in the following claims.

What is claimed is:

1. A method for minimizing the paging load in a multicell wireless telephone network comprising the steps of:

a.) determining the cell C in the cellular telephone network having the maximum paging load L thereon;

b.) identifying the paging zones in which cell C is located;

c.) for each zone in which cell C is located, determine the zone Z from which cell C can be removed so as to maximize the ratio of the decreased paging load on cell C ($p_z$) divided by the maximum increase in paging load on any other network cell ($m_z$);

d.) tentatively removing cell C from zone Z where the ratio $p_z/m_z$ is a maximum;

e.) determine the cell in the telephone network having the highest paging load L' assuming cell C has been removed from zone Z; and f.) permanently removing cell C from zone Z and repeating steps a.) through e.) if L>L' and leaving cell C in zone Z and ending if L is not greater than L'.

2. The method of claim 1 wherein the loading L on each cell due to paging is determined by counting the number of pages occuring in each cell in the network during a given period of time.

3. The method of claim 1 wherein the loading L on each cell due to paging is determined using the equation:

$$L = \sum_{Z(i) \in CZ(x)} I_i + \sum_{Z(i) \in NCZ(x)} I_i(1 - P(Z(i))r)$$

where $I_i$ is the probability that the last known cell of mobile m is i;

CZ(x) is the set zones containing the cell x;

NCZ(x) is all other zones;

r is the probability that the mobile will respond given it is in zone Z(i); and

P(Z(i)) is the probability that the mobile m is in zone Z(i) given the last known location of mobile m is in cell i contained in zone Z(i).

4. The method of claim 1 wherein $p_z$ is calculated using the equation:

$$p_z = I_i - I_i(1 - [P(Z(i)) - P(i,x)]r)$$

where:

$I_i$ is the probability that the last known cell of mobile m is i;

P(Z(i)) is the probability that the mobile m is in zone Z(i) given the last known location of mobile m is cell i contained in zone Z(i); and P(i,x) is the probability that the mobile will be in cell x given the last known location was cell i.

5. The method of claim 1 wherein $m_z$ is calculated using the equation:

$$m_z = I_i(P(i,x))r$$

where:

$I_i$ is the probability that the last known cell of mobile m is i; and

P(i,x) is the probability that the mobile will be in cell x given the last known location was cell i.

6. The method of claim 3 wherein $p_z$ is calculated using the equation:

$$p_z = I_i - I_i(1 - [P(Z(i)) - P(i,x)]r)$$

where:

$I_i$ is the probability that the last known cell of mobile m is i;

P(Z(i)) is the probability that the mobile m is in zone Z(i) given the last known location of mobile m is the cell i contained in zone Z(i); and P(i,x) is the probability that the mobile will be in cell x given the last known location was cell i.

7. The method of claim 3 wherein $m_z$ is calculated using the equation:

$$m_z = I_i(P(i,x))r$$

where:

$I_i$ is the probability that the last known cell of mobile m is i; and

P(i,x) is the probability that the mobile will be in cell x given the last known location was cell i.

8. The method of claim 4 wherein $m_z$ is calculated using the equation:

$$m_z = I_i(P(i,x))r$$

where:

$I_i$ is the probability that the last known cell of mobile m is i; and

P(i,x) is the probability that the mobile will be in cell x given the last known location was cell i.

9. The method of claim 6 wherein mz is calculated using the equation:

$$m_z = I_i(P(i,x))r$$

where:

$I_i$ is the probability that the last known cell of mobile m is i; and

P(i,x) is the probability that the mobile will be in cell x given the last known location was cell i.

10. A method for minimizing the paging load in a multicell wireless telephone network comprising the steps of:

a.) determining the probability P(i,j), for all cells in the network, that a given mobile is in cell j given the fact that its last known position was zone i and order the list of probabilities P(i,j) from largest to smallest;

b.) defining a plurality of paging zones Z(i) for each cell i in the network, each particular cell k being included in the zone Z(i) if the following inequality is true $$k+(1-(P(i,j_1)+P(i,j_2)+\ldots+p(i,j_k)))*n$$
$$<=k-1+(1-(p(i,j_1)+P(i,j_2)+\ldots+P(i,j_{k-1})))*n$$

and the order of successive probabilities used in the inequality is defined by said ordered list of probabilities P(i,j);

c.) determining the cell C in the cellular telephone network having the maximum paging load L thereon;

d.) identifying the paging zones in which cell C is located;

e.) for each zone in which cell C is located, determine the zone Z from which cell C can be removed so as to maximize the ratio of the decreased paging load on cell C ($p_z$) divided by the maximum increase in paging load on any other network cell ($m_z$);

f.) tentatively removing cell C from zone Z where the ratio $p_z/m_z$ is a maximum;

g.) determine the cell in the telephone network having the highest paging load L' assuming cell C has been removed from zone Z; and h.) permanently removing cell C from zone Z and repeating steps a.) through e.) if L >L' and leaving cell C in zone Z and ending if L is not greater than L'.

11. The method of claim 10 wherein the loading L on each cell due to paging is determined by counting the number of pages occuring in each cell in the network during a given period of time.

12. The method of claim 10 wherein the loading L on each cell due to paging is determined using the equation:

$$L = \sum_{Z(i) \in CZ(x)} I_i + \sum_{Z(i) \in NCZ(x)} I_i(1 - P(Z(i))r$$

where
- $I_i$ is the probability that the last known cell of mobile m is i;
- $CZ(x)$ is the set zones containing the cell x;
- $NCZ(x)$ is all other zones;
- r is the probability that the mobile will respond given it is in zone Z(i); and
- $P(Z(i))$ is the probability that the mobile m is in zone Z(i) given the last known location of mobile m is in cell i contained in zone Z(i).

13. The method of claim 10 wherein $p_z$ is calculated using the equation:

$$p_z = I_i - I_i(1 - [P(Z(i)) - P(i,x)]r)$$

where:
- $I_i$ is the probability that the last known cell of mobile m is i;
- $P(Z(i))$ is the probability that the mobile m is in zone Z(i) given the last known location of mobile m is cell i contained in zone Z(i); and
- $P(i,x)$ is the probability that the mobile will be in cell x given the last known location was cell i.

14. The method of claim 10 wherein $m_z$ is calculated using the equation:

$$m_z = I_i(P(i,x))r$$

where:
- $I_i$ is the probability that the last known cell of mobile m is i; and
- $P(i,x)$ is the probability that the mobile will be in cell x given the last known location was cell i.

15. The method of claim 12 wherein $p_z$ is calculated using the equation:

$$p_z = I_i - I_i(1 - [P(Z(i)) - P(i,x)]r)$$

where:
- $I_i$ is the probability that the last known cell of mobile m is i;
- $P(Z(i))$ is the probability that the mobile m is in zone Z(i) given the last known location of mobile m is the cell i contained in zone Z(i); and
- $P(i,x)$ is the probability that the mobile will be in cell x given the last known location was cell i.

16. The method of claim 12 wherein $m_z$ is calculated using the equation:

$$m_z = I_i(P(i,x))r$$

where:
- $I_i$ is the probability that the last known cell of mobile m is i; and
- $P(i,x)$ is the probability that the mobile will be in cell x given the last known location was cell i.

17. The method of claim 13 wherein $m_z$ is calculated using the equation:

$$m_z = I_i(P(i,x))r$$

where:
- $I_i$ is the probability that the last known cell of mobile m is i; and
- $P(i,x)$ is the probability that the mobile will be in cell x given the last known location was cell i.

18. The method of claim 15 wherein $m_z$ is calculated using the equation:

$$m_z = I_i(P(i,x))r$$

where:
- $I_i$ is the probability that the last known cell of mobile m is i; and
- $P(i,x)$ is the probability that the mobile will be in cell x given the last known location was cell i.

\* \* \* \* \*